March 22, 1932. C. N. MITCHELL Re. 18,389

HYDRAULIC CHECK

Original Filed July 6, 1926 3 Sheets-Sheet 1

Inventor
Courtney N. Mitchell

By Fay Oberlin & Fay
Attorneys.

March 22, 1932. C. N. MITCHELL Re. 18,389

HYDRAULIC CHECK

Original Filed July 6, 1926 3 Sheets-Sheet 2

Inventor
Courtney N. Mitchell

By Fay Oberlin & Fay
Attorneys

March 22, 1932. C. N. MITCHELL Re. 18,389

HYDRAULIC CHECK

Original Filed July 6, 1926 3 Sheets-Sheet 3

Inventor

Courtney N. Mitchell

By Fay Oberlin & Fay

Attorneys

Reissued Mar. 22, 1932

Re. 18,389

UNITED STATES PATENT OFFICE

COURTNEY N. MITCHELL, OF CLEVELAND, OHIO, ASSIGNOR TO THE CLEVELAND DOOR CHECK & MANUFACTURING COMPANY, OF CLEVELAND, OHIO, A CORPORATION OF OHIO

HYDRAULIC CHECK

Original No. 1,779,137, dated October 21, 1930, Serial No. 120,597, filed July 6, 1926. Application for reissue filed September 23, 1931. Serial No. 564,702.

This invention relates to door checks generally, and more particularly to door checks in which oil, glycerine or other suitable liquid is employed as a cushioning means and has for one of its objects the provision of a door check which shall avoid leakage of the liquid from the device and which may be readily adjusted for controlling the movement of the piston to accommodate the device to varying conditions of temperature and consequent variation in the stiffness of the liquid.

Another object of the invention is to provide a device of the character described which comprises few parts and which is efficient in operation and which is readily assembled and disassembled.

Another object of the invention is to provide a door check which is well adapted for quantity production at comparatively low cost.

Figure 1:
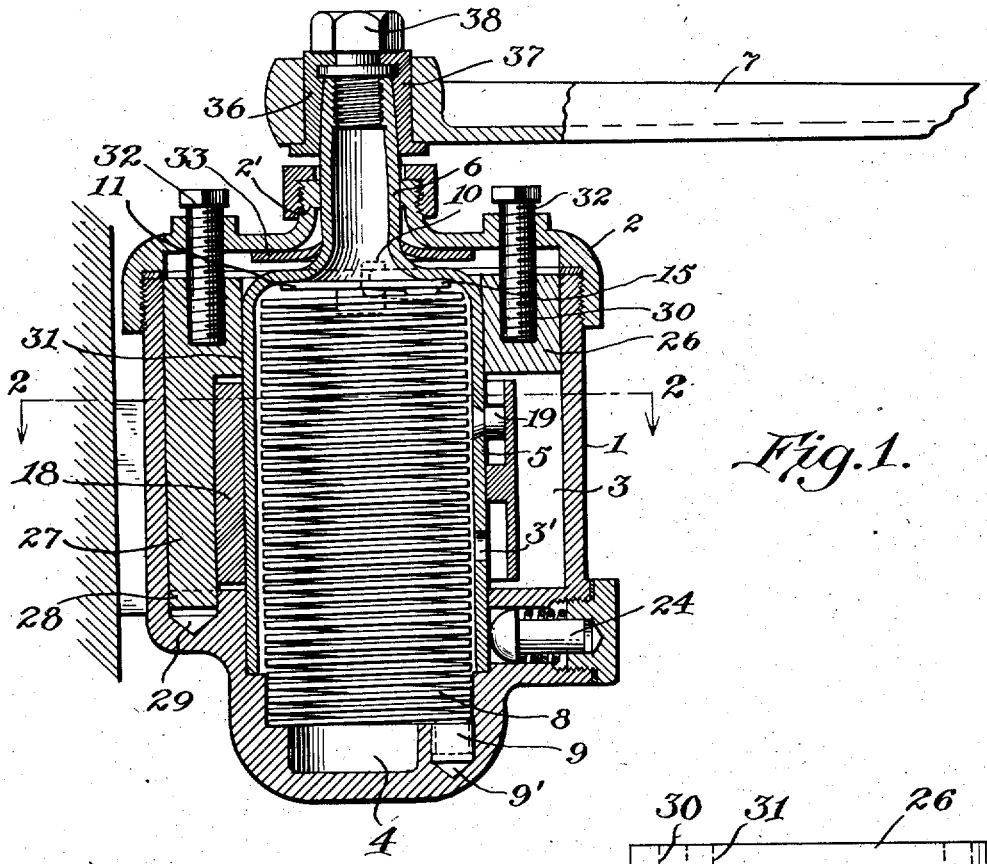
Figure 3:
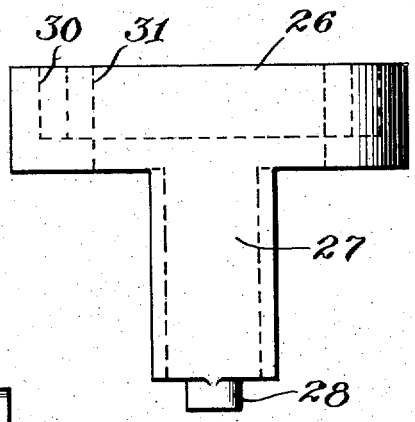
Figure 2:
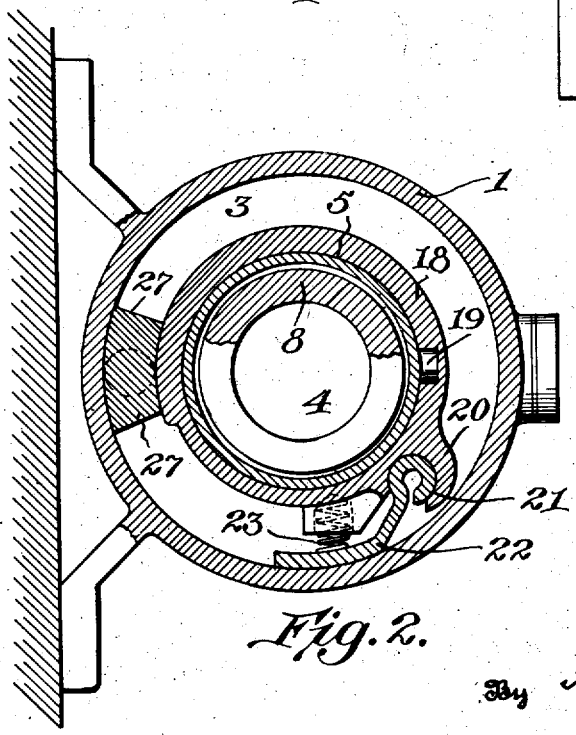
Figure 4:
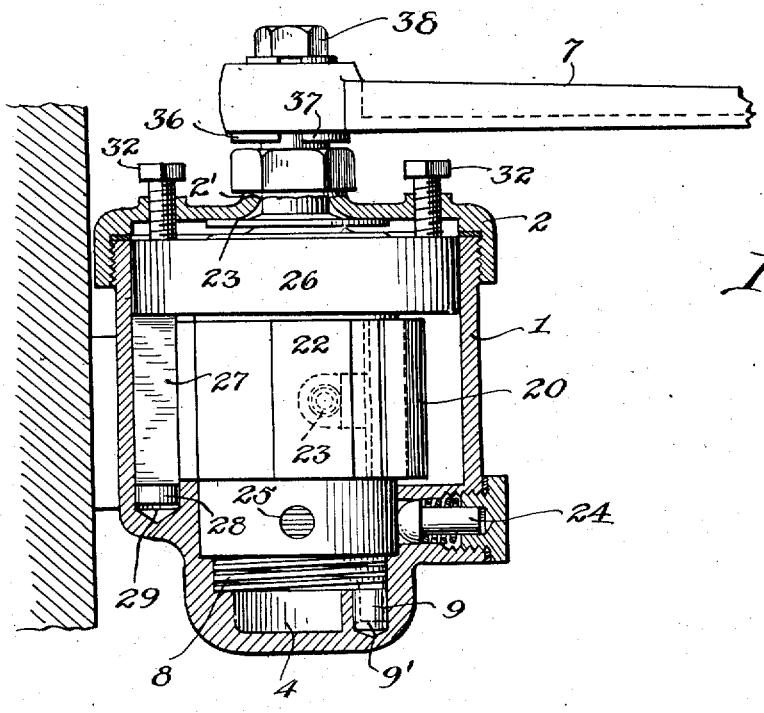
Figure 5:
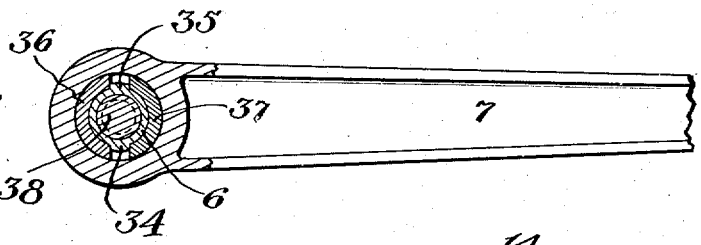
Figure 6:
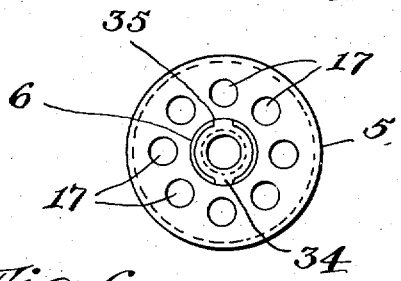
Figure 7:
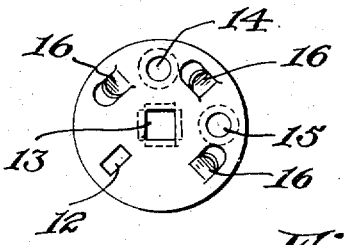
Figure 8:
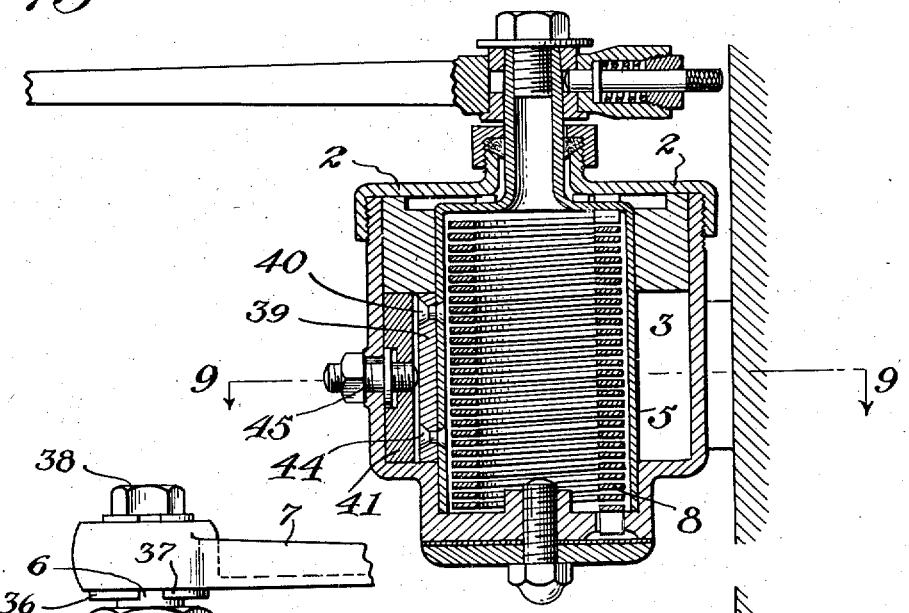
Figure 10:
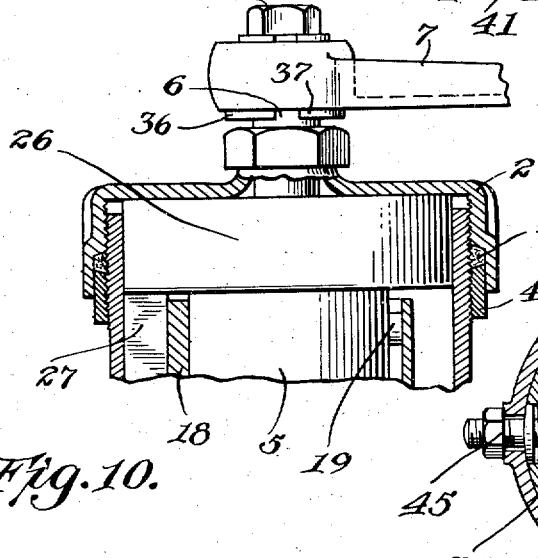
Figure 9:
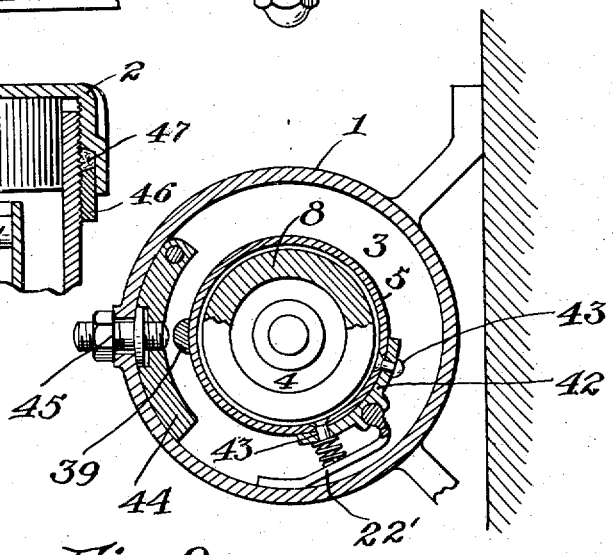

Further and more limited objects of the invention will appear as the description proceeds and by reference to the accompanying drawings in which Fig. 1 is a vertical sectional view of my improved door check; Fig. 2 is a horizontal sectional view on the line 2—2 of Fig. 1; Fig. 3 is a detail view in front elevation of the adjusting block; Fig. 4 is a view similar to Fig. 1 partly in vertical section and partly in side elevation; Fig. 5 is a horizontal sectional view of the door lever and means for securing the same to the rotatable drum; Fig. 6 is a top plan view of the rotatable drum on a reduced scale; Fig. 7 is a detail view of the plate which is secured to the top of the spring and which serves for adjusting the tension of the spring; Fig. 8 is a vertical sectional view similar to Fig. 1 showing a modification; Fig. 9 is a horizontal sectional view on the line 9—9 of Fig. 8; and Fig. 10 is a detail view partly in section and partly in elevation of a further modification.

Referring now to the drawings 1 designates a cup shaped casing closed at its lower end and opened at its upper end. The open upper end of the casing is closed by means of a cover 2 which is threadedly attached to the casing 1. The cover 2 is also provided with an opening 2′ the purpose of which will hereinafter appear. The casing 1 is divided into two substantially concentric compartments 3 and 4 by means of a drum 5 which is detachably secured within the casing 1. The drum 5 is shaped as most clearly shown in Fig. 1 and comprises a barrel portion and a tapered portion 6, which tapered portion projects outwardly through the opening 2′ in the cover 2 and is adapted to detachably receive thereon a door lever 7. Secured within the drum 5 is a coil spring 8 having projections 9 and 10 thereon. The projection 9 fits into a recess 9′ in the casing, as shown in Fig. 1. Resting upon the top of a coil spring 8 is a plate 11 shown in detail in Fig. 7 and the projection 10 of the spring fits into and projects through an opening 12 in the plate 11. The plate 11 is also provided with a square opening 13 and a pair of depressions 14 and 15, the depression 15 being deeper than the depression 14. The plate 11 rests on the top of the coil spring 8 and the depressions 14 and 15 serve to support the plate in a horizontal position. The plate 11 is also provided with a plurality of projections 16 which are cut out of the plate and bent up. The drum 5 is provided with a plurality of openings 17 which are adapted to receive the projections 16 of the plate 11. It will now be clear that the spring 8 is held at its lower end by the projection 9 engaging in recess 9′ and that the projection 10 projects through the recess 12 in the plate 11, and that the projections 16 engage in openings 17 on the drum 5 and that the tension of the spring may be changed by inserting a tool into the square opening 13 and turning the plate 11 to tension the spring, the projection 16 engaging in the openings 17 to hold the same in adjusted position. Within the casing about the drum 5 there is provided an annular member 18 which is secured to the drum by means of a rivet 19. The annular member 18 is provided with a projecting portion 20 having a recess 21 therein which is adapted to receive piston or vane 22 as shown most clearly in Fig. 2. The piston 22 is normally held in a position shown in Fig. 2 by means of a light coil spring 23. The casing is also provided with a spring pressed bolt or plunger 24 which is adapted to engage in an opening 25 in the drum 5 (see Fig. 4).

Non-rotatably secured about the drum 5 within the casing is a block 26 shown in detail in Fig. 3. This block 26 comprises a depending portion 27 having a projection 28 thereon which engages in a recess 29 in the casing. The block 26 is also provided with an annular channel 30 and an opening 31 through which extends the drum 5. Extending through the cover 2 is an adjustable set screw 32 which engages in the channel 30 for the purpose of adjusting the position of the block 26 with respect to the annular member 18. A plurality of such screws 32 may be provided if necessary. Secured about the tapered portion 6 of the drum 5 is a washer 33 the purpose of which will hereinafter appear. As hereinbefore stated the tapered portion 6 of the drum 5 passes through the opening 2′ in the cover 2 and the upper end of this portion is provided with oppositely disposed projections 34 and 35. Secured about the outer end of this tapered portion is a split bushing comprising two halves 36 and 37. The door lever 7 is secured over this bushing by a screw 38 which serves to hold the bushings in place.

*Operation*

It will now be clear that when the door is opened the drum 5 will be rotated within the casing and with it the annular member 18 to which is secured the piston 22. As both of the chambers 3 and 4 are filled with oil, it will be clear that when the door is opened the member 18 will be rotated in a counter clockwise direction as seen in Fig. 2, the oil will flow past the piston 22 against the compression of the spring 23 and the spring 8 will be placed under tension. If the door is opened far enough, the spring pressed bolt or plunger 24 will engage in recess 25 in the drum 5 and hold the door in the opened position. The door may be released by a slight pull on the same sufficiently strong to force the plunger 24 out of the recess 25. The spring 8 will now act to close the door. As the door is closed the annular member 18 and piston 22 will be rotated in a clockwise direction and a quantity of oil will be trapped between the piston 22 and the depending portion 27 of the block 26. It will also be clear that the oil must be allowed to escape from this chamber before the door can close. The rapidity of the escape of oil from the chamber between the piston 22 and sector 27 depends upon the adjustment of the block 26 as the oil must escape around the ends of the annular member 18 and the piston 22. It will therefore be clear that the adjustment of set screw 32 determines and will regulate the size of the openings at the opposite ends of the member 18 and piston 22 and in this way the closing movement of the piston and door may be regulated as desired.

One of the important features of my invention is the construction and mounting of the valve or piston 22. As will be seen in Fig. 2, this piston 22 is pivotally mounted within the recess 21 of the projection 20 and the spring 23 serves to hold the piston in the position shown in Fig. 2, but upon movement of the door in the opposite direction, the pressure of the liquid and the tension of the spring 23 both serve to force the valve or piston 22 radially outwardly into engagement with the walls of the casing. This type of valve and method of mounting the same practically eliminates any trouble or possibility of leakage past the valve and the oil can only escape slowly round the ends of the member 18 and piston 22 and the rapidity of this escape may be adjusted with precision by means of the set screw 32.

In Figs. 8 and 9, I have disclosed a slightly modified form of my invention showing a different means for adjusting the device for allowing the escape of oil during the closing movement of the door. In this form of my invention I have omitted the annular member 18 and substituted therefor a member 39 which is secured to the drum 5 by means of rivets 40 and 41. It will also be seen that I have eliminated the adjusting plate 11 and that I have provided a slightly different method of securing the piston 22 to the drum 5 due to the omission of the annular member 18. I therefore secure the piston 22′ to a plate 42 which is secured to the drum 5 by means of rivets 43. The member 39 and the valve 22′ move with the drum 5. Pivotally secured within the casing adjacent the drum 5 is a segmental block 44 which may be adjusted by means of a set screw 45 to move the block to vary the size of the oil escape opening. In this form of the invention the depending projection 27 of the block 26 is also omitted. In other respects this form of the invention is practically identical with that shown in Figs. 1 to 7, inclusive.

In Fig. 10 I have disclosed a further modification of the means for adjusting the size of the oil escape opening. This form of the invention is practically the same as that shown in Figs. 1 to 7 inclusive except that instead of the set screws 32, the adjusting block 26 is adjusted by turning the cover 2 to adjust the position of block 26 to vary the size of the oil escape opening. The cover 2 is held in adjusted position by means of a locking ring 46 and suitable packing 47.

It will now be clear that I have provided a device which will accomplish the objects of the invention as hereinbefore stated and it is understood that modification in detail may be resorted to without departing from the spirit of the invention or sacrificing any of its advantages. I therefore wish my invention to be limited only in accordance with the scope of the appended claims.

Having thus described my invention, what I claim is:

1. In a hydraulic check, a casing, an internal member adapted to move relatively thereto, a vane pivotally secured to said internal member and engaging with the walls of said casing and means for regulating the clearance at the edges of said vane.

2. In a hydraulic check, a casing of substantially cylindrical form, an oscillatory drum secured within said casing and dividing the same into a pair of compartments, a hingedly mounted vane carried by said drum and traversing the space between the walls of said casing and said drum.

3. In a hydraulic check, a casing, a drum rotatably mounted within said casing and dividing the same into a pair of concentric compartments, a vane pivotally secured to said drum and traversing the space between the walls of said casing and said drum, an element secured within said casing for restricting the passage between said casing and drum and means for varying the size of said restricted passageway.

4. In a door check, a casing, a drum secured within said casing and dividing the same into a pair of compartments adapted to be filled with liquid, a vane arranged within one of said compartments and pivotally secured to said drum and adapted to move therewith, an adjusting block secured about said drum and having a depending portion, means for adjusting the position of said block with respect to said vane whereby to restrict the flow of fluid from one side to the other of said vane.

5. In a door check, a casing, a drum within said casing dividing the same into a pair of compartments adapted to be filled with fluid, a member secured to said drum, a vane arranged within one of said compartments and pivotally secured to said member, an adjusting block within said casing having a portion projecting into said last mentioned compartment and means for adjusting the position of said block to vary the clearance between said block and said member.

6. In a door check, a casing, a drum within said casing dividing the same into a pair of compartments, a member arranged within one of said compartments and having a vane pivotally secured thereto and traversing the space between the walls of said casing and said drum, said member being rigidly connected with said drum, an adjusting block arranged within said last mentioned compartment and having a portion projecting downwardly and engaging with the bottom of said compartment, means for adjusting the position of said block for varying the clearance between said member and said block.

7. In a door check, a casing, a hollow drum arranged within said casing, a spring secured within said drum adapted to be tensioned when said drum is oscillated in one direction, said drum having a hollow stem projecting through said casing, means for adjusting the tension of said spring, said means being accessible through said hollow stem.

8. In a door check, a casing, a hollow drum rotatably mounted within said casing and having a portion projecting outwardly therefrom and adapted for attachment to a door lever, a chamber formed by said drum and casing and adapted to be filled with oil, a vane arranged within said chamber and pivotally secured to said drum and adapted to traverse the space between the walls of said casing and said drum and means for regulating the clearance at the edges of said vane.

9. In a door check, a casing, a drum arranged within said casing, a chamber formed by said drum and casing and adapted to be filled with oil, a member secured to said drum, a vane arranged within said chamber and pivotally secured to said member and so shaped as to allow oil to freely pass the same when moved in one direction and to be forced against the walls of said casing when moved in the opposite direction.

10. In a door check, a casing, a hollow drum rotatably secured within said casing and dividing the same into a pair of compartments, a spring secured within one of said compartments and connected with said drum and casing in such a manner as to be tensioned when said drum is moved in one direction, a portion of said drum projecting through said casing and adapted for attachment to a door lever, a vane secured to said drum and arranged within the other of said compartments and traversing the space between the walls of said casing and said drum, an imperforate block arranged within said last mentioned compartment and non-rotatably connected with said casing and means for regulating the clearance at the edges of said vane.

11. A door check of the character described comprising a casing, a drum rotatably mounted within said casing and dividing the same into a pair of concentric compartments, an imperforate vane secured to said drum and arranged within the outer compartment and traversing the space between the walls of said casing and said drum, an imperforate block arranged within said outer compartment and non-rotatably secured to said casing, a spring arranged within the inner compartment and connected with said drum and casing in such a manner as to be tensioned when said drum is rotated in one direction, said drum having a portion extending beyond said casing and adapted for attachment to a door lever, and means for varying the clearance at the edges of said imperforate vane.

12. A door check of the class described comprising a casing, a drum arranged within said casing and dividing the same into an inner and an outer compartment each adapted to be filled with a liquid, a spring secured in one of said compartments and connected with said drum and casing in such a manner that the spring will be tensioned when the drum is moved in one direction, one end of said drum extending beyond said casing and adapted for attachment to a door lever, a vane secured to said drum and arranged within one of said compartments and traversing the space between the walls of said casing and drum, an adjusting block arranged within said last mentioned compartment and having a depending portion thereon defining an abutment and means for adjusting the position of said block to vary the clearance at the edges of said vane.

13. In a hydraulic check, a casing, an internal member arranged within said casing and adapted for movement with respect thereto, said internal member dividing the casing into a pair of compartments, a piston pivotally connected with said member and means for varying the clearance between the ends of said piston and the walls of said casing.

14. In a hydraulic check, a casing, a hollow drum or shaft arranged within said casing, and dividing the same into a pair of compartments adapted to be filled with liquid, a piston arranged within one of said compartments and secured to said drum or shaft in such a manner as to have a limited movement with respect thereto, an adjusting block arranged about said drum or shaft, means for adjusting the position of said block with respect to said drum or shaft whereby to restrict the flow of liquid from one side of said piston to the other side thereof.

15. In a hydraulic check, a casing, a drum or shaft arranged within said casing and dividing the same into a pair of compartments, a piston arranged within one of said compartments and secured to said drum or shaft and adapted to move therewith, the connection between said piston and drum or shaft being such as to permit a limited movement of the piston with respect to the drum or shaft, an adjusting block arranged within said casing and surrounding said drum or shaft, means for adjusting the position of said block with respect to said piston whereby to restrict the flow of liquid from one side of said piston to the other side thereof.

16. In a hydraulic check, a casing, a hollow drum or shaft journaled in said casing, and dividing the same into a pair of compartments, a portion of said drum or shaft projecting through said casing, a piston arranged within one of said compartments and secured to said drum or shaft so as to have a limited movement with respect thereto, an imperforate block surrounding said drum or shaft and means for adjusting the position of said block to vary the clearance between said piston and the walls of said casing.

17. A hydraulic check comprising a casing, a hollow shaft journaled in said casing and dividing the same into a pair of concentric compartments, an imperforate piston secured to said shaft and arranged within the outer compartment and traversing the space between the walls of said casing and said shaft, an imperforate block surrounding said shaft and means for adjusting the position of the same with respect to said shaft, said shaft having a portion extending through said casing.

18. In a hydraulic check, a casing, a shaft arranged within said casing, a piston carried by said shaft and movable therewith, a combined closure and abutment member fitting within said casing and slidable longitudinally thereof whereby to render the same automatically self-seating therein, an interlock between said member and casing preventing relative rotation therebetween while permitting longitudinal movement thereof, the said member cooperating with said piston and casing to define an interrupted annular chamber.

19. In a hydraulic check, a casing, a shaft arranged within said casing, a piston constrained to turn with said shaft, a closure member fitting into said casing and having an integrally formed axially extending portion adapted to limit the axial position of the closure member and serving as an abutment and cooperating with said piston and casing to form an interrupted annular chamber and interlocking means on said casing and closure member for holding the closure member against relative rotation with respect to said casing.

20. In a hydraulic check, a casing, a shaft arranged within said casing, a wing piston attached to said shaft, a closure member fitting into the open end of said casing and having a channel formed therein, said closure member being also provided with an integral axially extending portion cooperating with said casing and piston to define an interrupted annular chamber and acting as an abutment and as a means for limiting the inward movement of said closure member, an interlock between said abutment and casing for preventing relative rotation thereof, threads provided on the outer wall of said casing and a member threadedly secured thereover and holding the closure member in place.

21. In a hydraulic check, a casing, a shaft arranged within said casing, a piston connected with said shaft, a closure member fitting within said casing and having an integrally formed axially extending member adapted to position said closure member with respect to said casing, and adjustable means associated with said closure member for regulating the flow of liquid within said casing.

22. In a hydraulic check, a casing, a shaft journaled in said casing and cooperating therewith to form a working compartment, a portion of said shaft projecting through said casing and adapted for attachment to a lever, a piston arranged within said working compartment and connected with said shaft so as to have a limited movement with respect thereto, a block surrounding said shaft and closing said working compartment, means associated with said block for regulating the flow of liquid within the working compartment.

In testimony whereof I hereunto affix my signature.

COURTNEY N. MITCHELL.